United States Patent [19]

Bailey et al.

[11] Patent Number: 5,094,695
[45] Date of Patent: Mar. 10, 1992

[54] FURNACE CLEANLINESS MONITOR FOR HIGH REFLECTIVITY ASH

[75] Inventors: Ralph T. Bailey, Uniontown; Hudson R. Carter, Granville, both of Ohio

[73] Assignee: The Babcock & Wilcox Company, New Orleans, La.

[21] Appl. No.: 621,416

[22] Filed: Dec. 3, 1990

[51] Int. Cl.$^5$ .......................... B08B 7/04; B08B 9/00; C21B 7/24; G01J 1/14
[52] U.S. Cl. ................... 134/18; 134/22.1; 134/113; 250/330; 250/342; 266/81; 266/90; 266/91; 356/446
[58] Field of Search ............. 134/1, 18, 34, 37, 113, 134/22.1; 266/81, 90, 91; 250/330, 392; 356/446

[56] References Cited

U.S. PATENT DOCUMENTS

| | | | |
|---|---|---|---|
| 2,013,511 | 8/1934 | Steinbacher | 134/22.1 |
| 3,782,336 | 1/1974 | Nelson | 122/379 |
| 4,209,028 | 6/1980 | Shenker | 134/56 R |
| 4,644,173 | 2/1987 | Jeffers | 250/227.23 |
| 4,690,634 | 9/1987 | Herngren et al. | 431/8 |
| 4,944,594 | 7/1990 | Burk | 356/446 |
| 4,945,253 | 7/1990 | Frohardt | 356/446 |

OTHER PUBLICATIONS

Water Cleaning Performance Evaluations, Nebraska Public Power District, Gerald Gentleman Station, Final Report, Nov. 12, 1990.
"Flame Quality Analyzer for Temperature Measurement and Combustion Control", Sensors, vol. 5, Jan. 1988.
On-Line Imaging and Emissivity Measurements to Determine Furnace Cleanliness, H. R. Carter and C. G. Koksal, draft copy of paper to be presented in Oct. 1991.
Cost and Quality of Steam Coal Deliveries, Producing State/Consuming State, "Power Plant Deliveries, Data for February 1991," from National Coal Association, May 1991 issue.
"Reflectivity/Emissivity Character of Western Fuel", Clark, Gregory A., Alliance Research Center 1990, Western Fuels Conference, Sep. 11, 1990, Minneapolis, MN.
"Measurement of Radiative Properties of Ash and Slag by FT-IR Emission and Reflection Spectroscopy," Solomon, Peter et al., submitted to Journal Heat Transfer 1991.
"Monitoring of Recovery Boiler Interiors Using Imaging Technology", Anderson, Marc J. et al., CPPA—TAPPI 1989 International Chemical Recovery Conference.
Promotional Brochure Advertisement.
"Flame Quality Analyzer for Temperature Measurement and Combustion Control", R. T. Bailey and H. R. Carter.

*Primary Examiner*—Theodore Morris
*Assistant Examiner*—Saeed Chaudhry
*Attorney, Agent, or Firm*—Vytas R. Matas; Robert J. Edwards; Daniel S. Kalka

[57] ABSTRACT

A method and apparatus of initiating and terminating the cleaning of a furnace wall to remove reflective ash which been deposited thereon, comprises a video or infrared monitor which monitors the light being reflected from the furnace wall or the ratio of the reflected to the incident light, the intensity of reflected light or ratio of the reflected to the incident light increasing as additional reflective ash is deposited. When the reflected light intensity reaches a selected value, cleaning is initiated and measurement of the reflected light is continued to monitor when the reflected light reaches a low substantially constant intensity. At that point, the cleaning operation is terminated since the constant reflected light intensity indicates a substantially clean condition.

13 Claims, 2 Drawing Sheets

FURNACE CLEANLINESS MONITOR FOR HIGH REFLECTIVITY ASH

FIELD AND BACKGROUND OF THE INVENTION

The present invention relates in general to controls for use in furnaces and other high temperature, dirty environments, and in particular to a new water, steam, air, or combinations thereof cleaning control which is capable of determining the cleanliness of a furnace wall which receives deposits of highly reflective ash so as to initiate and terminate leaning operations.

Western fuels, such as Powder River Basin (PRB) coals, are low in sulfur; however, they are high in calcium and silicon. This composition results in a thin, white tenacious ash on the furnace walls. This ash (called slag) is not easily removed using conventional air or steam cleaning devices.

A number of utilities are currently burning PRB coal and more are expected to switch to PRB coal with the passage of the Clean Air Act. The PRB coal deposited ash is highly reflective. The ash reduces the heat absorption of the furnace causing high temperatures in the convection passes of the boiler.

Waterblowing has been shown to be effective in removing the ash and restoring furnace heat transfer effectiveness. More utilities are expected to employ waterblowing when PRB coal is used.

The PRB ash deposit is thin and tight. This is in stark contrast to the heavy deposits visually apparent in furnaces burning other coals. Therefore, the decision to clean the furnace cannot be made based on a visual inspection and overcleaning (with water) is not desired because of thermal shock consideration.

Since there is a thermal shock consideration in using water, it is desirable to only clean the wall when cleaning is necessary. All plants currently clean on a time sequence. Most plants use a cleaning period of about four hours. Video recording taken at one plant reveal that for the hot wall (this was a CE tangentially fired boiler) four hours was an appropriate time period. However, on the cold wall a much longer period than four hours should be used. Based on the video recording even after ten hours the cold wall was still relatively clean.

A need thus exists for apparatus and techniques which are capable of accurately distinguishing between a clean condition for the furnace wall which does not require immediate waterblowing and an unclean condition which does require waterblowing.

SUMMARY OF THE INVENTION

An object of the present invention is to provide a real-time on-line technique for indicating where in the furnace to clean, when to start the cleaning, and when to stop the cleaning.

The invention is based on the fact that the deposits from Powder River Basin (PRB) coals appear white and are more reflective at visible and near infrared wavelengths than are Eastern coals or "clean" boiler tubes.

As deposits form on initially clean, low reflectance (high emittance) boiler tubes, the fraction of light that originates in the flame and is reflected off the boiler tubes will increase. The change in the amount of light reflected from the boiler walls is a measure of the cleanliness of the wall.

Accordingly, an object of the present invention is to provide a method and apparatus of initiating and terminating the cleaning of a furnace wall to remove reflective ash deposited thereon, comprising: measuring the intensity of light reflected from the furnace wall on an ongoing basis, the intensity being proportional to the cleanliness of the wall with lower intensity corresponding to a cleaner condition and higher intensity corresponding to a less clean condition; detecting when the intensity of light has increased to a selected peak value; initiating cleaning of the furnace wall to remove reflective ash therefrom and to decrease the intensity of light reflected therefrom; after initiation of the cleaning, continuing to measure the intensity of light reflected from the furnace wall on an ongoing basis and determining when the intensity has reached a low constant level indicating a clean condition for the wall; and terminating the cleaning operation when the light intensity has reached the low constant level.

DESCRIPTION OF THE PREFERRED EMBODIMENT

Figure 1:
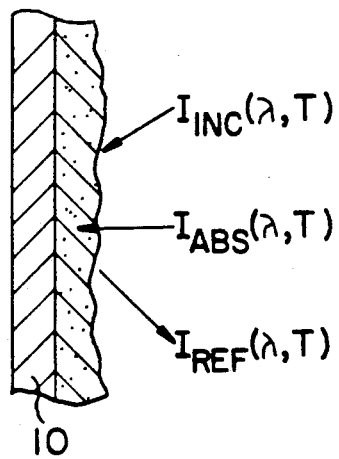
FIG. 1 is a schematic view showing part of a furnace wall and the partial absorption and partial reflection of incident light with respect to the wall.

FIG. 1 shows the radiant heat flow at the furnace wall. The radiant intensity incident on the boiler wall is $I_{INC}(\lambda,T)$, which is a function of wavelength ($\lambda$) and flame temperature (T) as well as furnace geometry and flame properties. The fraction of this energy that is absorbed by the boiler wall $I_{ABS}$ can be determined as:

$$I_{ABS}(\lambda,T) = \alpha(\lambda) \cdot I_{INC}(\lambda,T)$$

where $\alpha(\lambda)$ is the surface absorptivity. The fraction of the incident radiation that is reflected from the wall $I_{REF}(\lambda,T)$ is:

$$I_{REF}(\lambda,T) = I_{INC}(\lambda,T) - I_{abs}(\lambda,T)$$

$$I_{REF}(\lambda,T) = I_{INC}(\lambda,T) - \alpha(\lambda) \cdot I_{INC}(\lambda,T)$$

$$I_{REF}(\lambda,T) = I_{INC}(\lambda,T) \cdot (1-\alpha(\lambda))$$

Since emittance $e(\lambda) = 1 - \alpha(\lambda)$ then $$I_{REF}(\lambda,T) = I_{INC}(\lambda,T) \cdot e(\lambda)$$

The magnitude of the reflected ratio is directly dependent on the surface emittance, $e(\lambda)$, of the boiler wall, which for this application is directly dependent on the boiler wall cleanliness.

Figure 2:
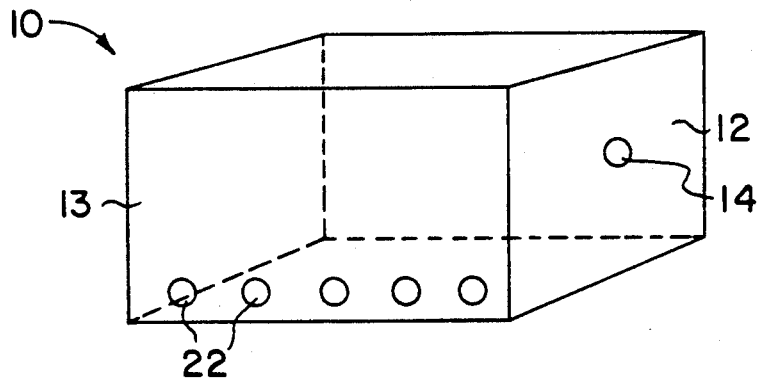
FIG. 2 is a perspective view of a furnace wall enclosure which can be serviced by the present invention.

As shown in FIG. 2, the furnace walls are each viewed using technology incorporated in the so-called Flame Quality Analyzer (FQA).

The FQA was developed by The Babcock & Wilcox Company and is disclosed in U.S. Pat. No. 4,644,173. An IR video technique is also disclosed in U.S. Pat. No. 4,539,588.

Burners 22 are shown in side wall 13 of the furnace enclosure 10 in FIG. 2.

In a furnace with heavy particular loading, it may be necessary to look at adjacent walls from a corner or to insert a probe to check a wall.

Figure 3:
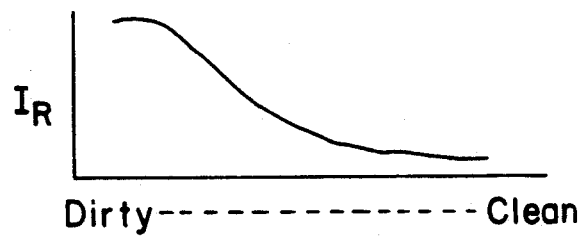
FIG. 3 is a graph plotting light reflected intensity against a clean and dirty condition for the furnace wall.

As the furnace wall proceeds from a clean to a dirty condition the light intensities $I_R$ measured with the FQA 14 in wall 12 will likewise increase as shown in FIG. 3.

A clean furnace tube has an emissivity of about 0.7–0.9 while an ash (PRB) covered tube has an emissivity of 0.2 or 0.3 (reflectivity = 1 − emissivity). Therefore, as the furnace walls become covered with ash, the reflected Na and K wavelength radiation (the sodium and potassium lines in the spectrum) increases until the complete tube surface is ash covered. This is measured as increases in $I_{NA}$ and $I_K$, where $I_{NA}$ is the intensity of the sodium line in the spectrum and $I_K$ is for the potassium line.

As the tube is cleaned, the $I_{NA}$ and $I_K$ decreases until the tube is clean and $I_{NA}$ and $N_K$ become In addition to wall cleanliness, the absolute magnitude of radiation reflected from the boiler wall will depend on flame temperature, T, and may depend on boiler load. Compensation for flame temperature can be easily achieved since the FQA will measure the effective temperature of the radiated/emitted light. Thus, the change in magnitude of the reflected light due to changes in the temperature of the radiating source can be eliminated by normalizing the reflected light energy by the blackbody radiation function evaluated at the measured temperature.

It is also possible to compensate for both flame temperature and boiler load by monitoring the magnitude of the incident radiation on the wall as well as the reflected radiation from the wall. The ratio of reflected-to-incident radiation is a measure of the wall emittance, and will be independent of flame temperature and will be insensitive to boiler load.

Figure 4:
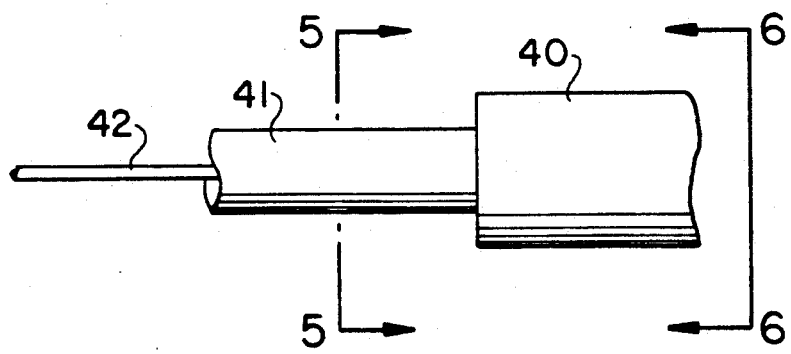
FIG. 4 is a side view of a probe for measuring an intensity ratio according to the invention.

In order to make this ratio measurement, it is necessary to measure incident intensity and the reflected intensity at the wall at a selected wavelength. For this application, the invention utilizes one or both of the sodium or potassium spectral lines or all visible radiation. A sensing probe illustrated in FIG. 4 may be associated with each of the water lances used for cleaning the furnace wall. The probes are located in a web part of the furnace wall between tubes. A small diameter hole or slit is placed in the web material to provide access to the interior of the furnace. On a periodic basis, the probe is inserted into the furnace region to provide a concurrent measurement of both incident and reflected intensities at the selected wavelengths.

Figure 6:
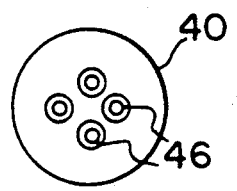
FIG. 6 is a view taken along line 6—6 of FIG. 4.
Figure 5:
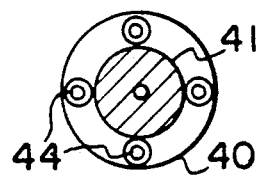
FIG. 5 is a view taken on line 5—5 of FIG. 4.

To this end each probe has a body 40 with a support 41. An optical fiber 42 transmitts intensity signals from four detectors 44 in the rear wall of body 40 (see FIG. 5) and four detectors 46 in the front wall of the body (FIG. 6). The ratio in the signals from detectors 44 and 46 correspond to the reflected-to-incident radiation ratio.

The FQA technique provides techniques provide spatially resolved measurements so that only those areas of the boiler wall that have the greatest deposit will be selected for cleaning.

When using emissivity to find reflectance, it is noted that spectral emissivity of a deposit is defined as the ratio of the intensity of radiation emitted by the surface of the deposit to the intensity of radiation emitted by a blackbody (a perfect emitter), with both at the same temperature. Total emissivity, as opposed to spectral emissivity is the integration of the spectral emissivity over all wavelengths.

While a specific embodiment of the invention have been shown and described in detail to illustrate the application of the principles of the invention, it will be understood that the invention may be embodied otherwise without departing from such principles.

What is claimed is:

1. A method for controlling the initiation and termination of a cleaning system for a furnace wall to remove reflective ash deposited thereon, comprising:

measuring the intensity of light reflected from the furnace wall on an ongoing basis, the intensity being proportional to the cleanliness of the wall with lower intensity corresponding to a cleaner condition and higher intensity corresponding to a less clean condition;

detecting when the intensity of light has increased to a selected value;

initiating the cleaning system of the furnace wall to remove reflective ash therefrom which results in a decrease in intensity of light reflected therefrom;

continuing to measure the intensity of light reflected from the furnace wall on an ongoing basis after initiation of the cleaning system and determining when the intensity has reached a level indicating a clean condition for the wall; and terminating the cleaning system operation when the light intensity has reached the determined level.

2. A method according to claim 1 including detecting the emissivity of the furnace wall in order to measure the intensity of reflected light therefrom.

3. A method according to claim 1 wherein the furnace wall defines part of a furnace containing a flame, determining the temperature of the flame and compensating the measurement of the intensity of reflected light by the flame temperature for obtaining an absolute magnitude for the intensity of light reflected from the wall.

4. A method according to claim 1 including measuring the intensity of light which is incident on the wall and measuring the intensity of light reflected from the wall on the basis of a ratio between reflected and incident light.

5. A method according to claim 4 wherein the furnace wall defines a furnace enclosure containing a flame having a temperature, the ratio being independent of the flame temperature.

6. A method according to claim 1 including measuring the intensity of reflected radiation over an area of the wall furnace, locating the area of greatest intensity corresponding to a location requiring more cleaning, and initiating the cleaning system for the location.

7. An apparatus for controlling the initiation and termination of a cleaning system for a furnace wall to remove reflective ash which is deposited thereon, comprising:

means for measuring the emittance of radiation from the furnace wall, the emittance increasing with a less clean condition and decreasing with a more clean condition;

means for determining when the intensity reaches a selected value corresponding to a condition requiring cleaning;

means for initiating the cleaning system when the selected value has been reached;

means for continuing the measurement of the intensity during the cleaning operation and until the intensity drops to a substantially constant low level; and means for terminating the cleaning system operation when the intensity has reached the low level.

8. An apparatus according to claim 7 wherein the means for measuring the intensity comprises a near infrared detecting monitor.

9. An apparatus according to claim 8 wherein the monitor comprises a video monitor.

10. An apparatus according to claim 7, wherein the means for measuring the intensity comprises a flame quality analyzer.

11. An apparatus according to claim 7, wherein the means for measuring the intensity comprises a probe having at least one rearwardly facing detector and at least one forwardly facing detector.

12. An apparatus according to claim 7 wherein the means for measuring the intensity comprises a visible detecting monitor.

13. An apparatus according to claim 7 wherein the means for measuring the intensity comprises an infrared detecting monitor.

* * * * *